July 21, 1953     W. S. BUNNELL     2,645,952
DEEP DRILLING ATTACHMENT Filed Aug. 10, 1949     5 Sheets-Sheet 1

INVENTOR.
William S. Bunnell,
BY

July 21, 1953

W. S. BUNNELL

2,645,952

DEEP DRILLING ATTACHMENT

Filed Aug. 10, 1949

INVENTOR.
William S. Bunnell,
BY
Brown, Jackson, Boettcher & Dienner.
Attys.

July 21, 1953  W. S. BUNNELL  2,645,952
DEEP DRILLING ATTACHMENT
Filed Aug. 10, 1949  5 Sheets-Sheet 3

INVENTOR.
William S. Bunnell,
BY
Brown, Jackson, Boettcher & Dienner.
Attys.

Patented July 21, 1953

2,645,952

UNITED STATES PATENT OFFICE 2,645,952

DEEP DRILLING ATTACHMENT

William S. Bunnell, Chicago, Ill., assignor to Boyar-Schultz Corporation, Chicago, Ill., a corporation of Illinois Application August 10, 1949, Serial No. 109,583

10 Claims. (Cl. 77—32.3)

The present invention relates to an improved deep drilling attachment for automatic screw machines, hand screw machines, turret lathes and other like machines which revolve the work that is being drilled. In these machines the drill is held against rotation, and the rod stock, bar stock or work pieces are revolved relatively to the drill. The drill is given a traverse motion into and out of drilling position, and is given a progressive feeding motion during the drilling operation, but in the type of machine to which my invention has particular application the drill is not rotated.

The performance of deep drilling operations by machines of the above general description have heretofore been laborious, time consuming operations subject to breakage of drills, loss of concentricity and other difficulties. For example, in automatic screw machines the present recognized limit of hole depth in a drilling operation is approximately three times the drill diameter. If the hole depth substantially exceeds three times the drill diameter, it is usually necessary to perform step drilling with successive pull-outs in order to clear the chips, get coolant to the point of the drill, etc. It will be obvious that in automatic screw machines and other machines where the time element is an extremely important factor, the necessity of making one or more pull-outs in a drilling operation is very objectionable from the standpoint of consuming time and also from the standpoint of complicating the automatic cycle of the screw machine. Deep drilling operations are also frequently complicated by the nature of the material being drilled. For example, in the drilling of elastomers, plastics, and metals having stringy characteristics, such as copper, aluminum or the like, there is a pronounced tendency to produce long stringy chips. These chips often cause the drill to run off center, and tend to cause binding of the drill; and also scoring between the drill and the wall of the bore with consequent enlargement of the bore, and frequently restrict or prevent coolant from reaching the tip of the drill.

The general object of the present invention is to provide an improved non-rotating drill mount for automatic screw machines, hand screw machines, turret lathes and the like which will avoid these deep drilling difficulties heretofore encountered on such machines by imparting an axial vibratory movement to the non-rotating drill so as to break up the chips into relatively small pieces. My improved deep drilling attachment is preferably arranged to impart a relatively high speed vibratory movement to the drill, such as several thousand oscillations or vibrations per minute, and this high speed vibratory movement occurring concurrently with the feeding motion of the non-rotating drill tends to break up the chip stock into relatively fine particles. These broken up pieces or particles readily clear themselves from the drilled hole by passing out through the flutes of the drill.

As a result of this high speed oscillation of the non-rotating drill, with consequent breaking up of the chips into relatively small particles, I am enabled to perform deep drilling operations on automatic screw machines, hand screw machines, turret lathes and the like without any tendency of the drill to bind and without any necessity of performing pull-out operations. With my improved deep drilling attachment it is commonplace to drill holes in stringy material to a depth of seven times or more the drill diameter without the necessity of pull-outs. Thus, in practically all situations, the drilling can be performed in one continuous motion when using this attachment. The use of this attachment also improves the concentricity accuracy of the drilled holes by avoiding the necessity of pull-outs and by avoiding the action of relatively large chips tending to score or enlarge the bore or even deflect the drill.

Another object of the invention is to provide a deep drilling attachment of the above general description which can be quickly and easily mounted on the conventional or standard turret of an automatic screw machine, hand screw machine, turret lathe or the like. As is well known to those skilled in the art, in these machines the bar stock or the work piece is held in or carried by the spindle and rotated axially of the spindle. The turret of such a machine is usually provided with a plurality of tool positions or stations, six of such positions being typical, and the turret is indexed around to bring the different tools successively into position to work on the revolving bar stock or work piece held by the revolving spindle. The turret is adapted to mount interchangeably a wide variety of tools, such as centering drills, deep drills, reamers, tapping tools, stops, etc. Each tool position of the turret has a standard size of bore therein for mounting the different types of tool, and there are space limitations laterally and radially of the turret beyond which it is not practicable to have any part of the tool or its mounting extend. As above stated, it is one of the objects of the invention to provide a deep drilling attachment which will be received within this standard size of mounting bore in the turret, and which will not project beyond these space limitations with regard to the turret, but which will still mount a reciprocable drill holder, and embody mechanism for imparting high speed oscillation to this drill holder. One of the features of the construction by which this object is obtained is an extremely compact arrangement of cam and roller mechanism disposed axially of the turret bore and drill holder for imparting the high speed oscillation to the drill holder. A rotary power drive is transmitted to the cam and roller mechanism through a pair of bevel gears mounted within the turret, whereby the indexing of the turret to its different positions does not interfere with the drive to the cam and roller mechanism. In a conventional automatic screw machine, this bevel gear set can be driven from an overhead counter shaft, or from a small auxiliary counter shaft in rear of the machine, substantially in the same manner that tap or die revolving attachments are driven in these machines, except that a higher driving speed is preferably employed with this deep drilling attachment than is customary in the case of tap or die revolving attachments. In the case of hand screw machines and turret lathes, the bevel gear set within the turret may be driven from an individual electric motor drive unit mounted directly upon the top of the turret and swinging therewith in the indexing motion of the turret. This same arrangement of individual motor drive unit may also be mounted at the end of the turret in automatic screw machines, in lieu of driving the bevel gear set from a counter shaft.

Another object of the invention is to provide a deep drilling attachment of this general description embodying improved adjustment features which enable the drill to be quickly and easily aligned with the center line of the machine or rotating spindle.

Another object of the invention is to provide a deep drilling attachment of this general description which will impart a plurality of oscillations to the drill holder for each revolution of the driving cam. This enables a relatively high speed oscillation of the drill holder to be obtained without requiring correspondingly high speed of the revolving cam. In the preferred embodiment of my invention, I obtain two oscillations of the drill for each revolution of the cam, this being obtained by employing a face type of cam as the driving cam, this face cam having a plurality of cam peaks and valleys and there being a unique differential speed relation between the face cam and the following rollers whereby the rollers revolve at a speed approximately one-half of the cam speed.

An important safety feature is obtained in the performance of drilling operations with my improved deep drilling attachment, as compared to the performance of drilling operations using a rotating drill. A rotating drill is always hazardous because of the possibility of the hands or clothing of the operator becoming caught in the drill, and also because of the danger of flying parts in the event of drill breakage. These hazards are all avoided by the use of a drill which does not rotate but only reciprocates.

Other objects, features and advantages of the invention will appear from the following detailed description of one preferred embodiment of the invention. In the accompanying drawings illustrating such embodiment.

Figures 1, 2:
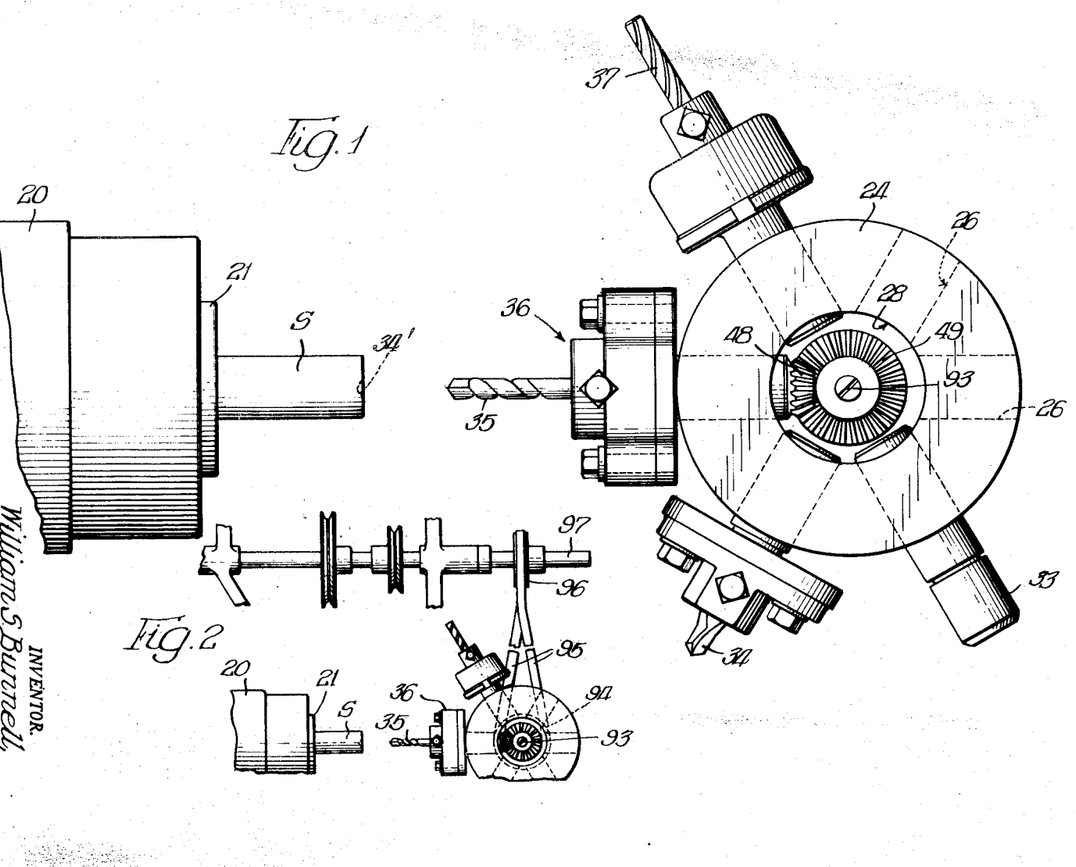
Figure 1 is a side elevational view fragmentarily indicating the turret and adjacent part of the spindle head of a conventional automatic machine, my improved deep drilling attachment being shown in the operating position of the turret.
Figure 2 is a schematic view illustrating one typical manner of transmitting a drive to the bevel gear set in the turret.

Referring first to Figure 1, this figure illustrates the turret and adjacent portion of the spindle head of a single-spindle automatic screw machine typically represented by Brown & Sharpe models OOG, OG, 2G, OOO and 2. It will be understood that the above reference to these specific machines is solely by way of example, because the invention is capable of use on practically any automatic screw machine. In this figure, a portion of the spindle head or frame is indicated at 20, and the rotating spindle carried therein is indicated at 21. This spindle 21 is arranged to be rotated in either direction through a variable ratio drive which can be set to rotate the spindle at various speeds ranging from as low as 50 revolutions a minute to as high as six thousand revolutions a minute. The end of a length of bar stock S is shown projecting beyond the spindle 21. As is well known to those skilled in the art, this bar stock is held firmly in the spindle by a spring collet or the like so as to rotate with the spindle. It will be assumed that a relatively deep hole is to be drilled and reamed into the end of this bar stock by the tools mounted on the turret 24. The bar stock S may be any metal, alloy, plastic, elastomer, or other material which may be machined in a screw machine.

In a single-spindle machine of the type above described, the turret 24 is usually mounted on a horizontal axis so that the individual tools carried thereby extend horizontally therefrom when they are being used. The turret is provided with a plurality of radially extending cylindrical bores 26, usually six in number, which constitute the different tool positions on the turret. Formed in the outer face of the turret is a central cylindrical opening 28 for mounting the bevel gear set. The turret 24 is rotatably mounted upon a turret slide, not shown, which is adapted to have sliding movement along guide ways on the bed of the machine, toward and away from the spindle 21 and bar stocks S. This movement of the turret slide gives traverse to the turret 24 for moving the successive tools longitudinally into and out of operative positions, and also gives the desired feeding movement to the tools in such operations as drilling, reaming etc. In an automatic screw machine, such motions of the turret slide are, of course, automatically controlled.

In Figure 1 I have illustrated the turret as mounting four separate tools which are typically employed for drilling and reaming axial holes in the bar stock, as above described. The first of these tools is a stop 33 adapted to abut against the end of the revolving bar stock S for predetermining the relative positions of the parts at the start of the operation; the second of these tools is a center drill 34 for drilling a shallow centering hole 34' in the end of the bar stock; the third of these tools is a twist drill 35 mounted in my improved deep drilling attachment 36; and the fourth of these tools is a reamer 37 for reaming out the drilled hole. Each of the above tools is provided with a cylindrical mounting shank adapted to be rigidly clamped in one of the tool positioning bores 26, as is well known to those skilled in the art. The automatic indexing mechanism in these automatic screw machines automatically rotates the turret 24 to present each of these tools to the rotating bar stock in the successive stages of the operation.

Referring now to the details of my improved deep drilling attachment 36 illustrated in Figures 3 to 12, inclusive, it will be seen that this attachment comprises a tubular cylindrical shank stem 41 adapted for mounting in one of the tool positioning bores 26. Lining the bore in this shank 41 is a renewable bearing bushing 42, and mounted at the end of this bushing is a shank washer 43. Rotatably mounted within the shank bushing 42 is an actuating cam shaft 44 which carries a radially extending face cam head 45 at its outer end, as I shall presently describe. Extending axially into the inner end of the cam shaft 44 is a threaded bore 46 into which screws a threaded stud or shank 47 and carrying a bevel pinion 48 at its inner end. This bevel pinion 48 is adapted to mesh with a driving bevel gear 49 mounted in the central opening 28 of the turret 24. This driving bevel gear 49 is arranged to be driven from the main drive countershaft or from an auxiliary countershaft, as I shall hereinafter describe in connection with Figure 2.

Figure 3:
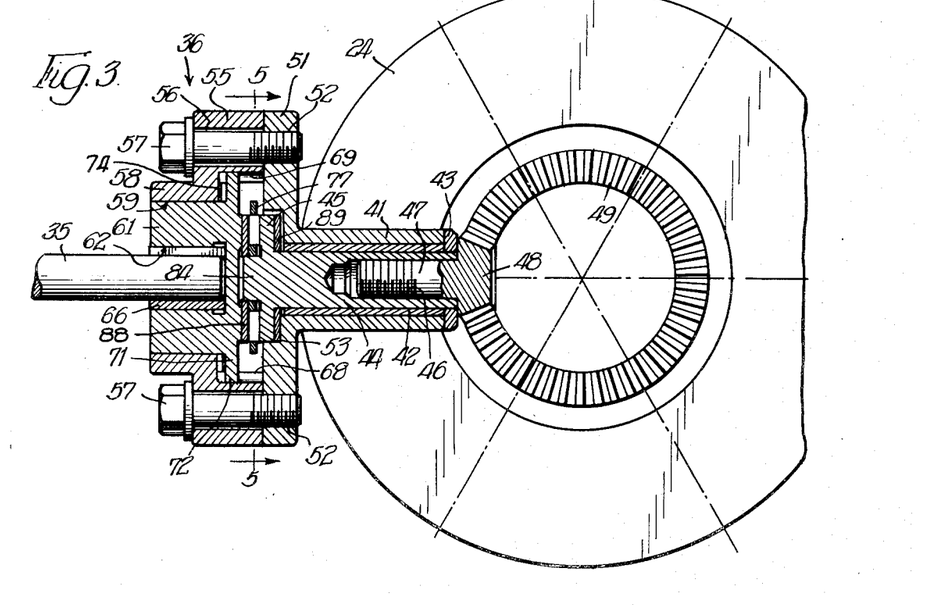
Figure 3 is an axial sectional view through the deep drilling attachment.
Figure 4:
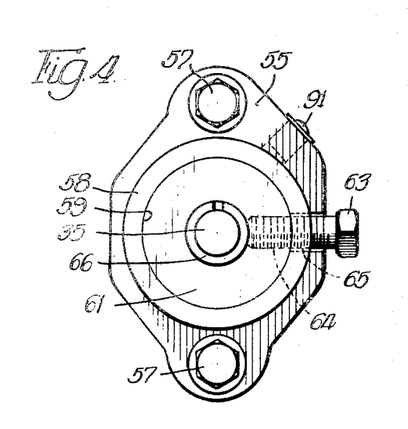
Figure 4 is an end elevational view thereof.

Projecting radially from the outer end of the tubular shank 41 is a flange which together with the shank forms a body portion 51. The flange 41 has two threaded holes 52 extending through diametrically opposite portions thereof. This tubular shank 41 and extending flange portion 51 constitute a mounting body for mounting the attachment. The outer face of the mounting body is formed with an axial cylindrical recess 53 in which revolves the cam head 45. Detachably secured to the front of the flanged body portion 51 is a tool head or cover cap portion 55 provided with through holes 56 through which pass cap screws 57 for threading into the tapped holes 52 of the body portion 51. This tool head or cover portion 55 is provided with a central guide boss 58 having an accurately ground guide bore 59 in which reciprocates the drill holder 61. This drill holder is formed with an axially aligned cylindrical socket 62 for receiving the shank of the drill 35. The drill 35 is shown as a spirally fluted twist drill, but it might be any metal cutting type of drill, or any other drill suitable for the material being drilled. The drill is held in this socket by a set screw 63 (Figure 4) which threads through a tapped bore 64 passing laterally through the drill holder 61. The surrounding guide boss 58 of the cover portion 55 is provided with a connecting hole 65 of substantially larger diameter than the set screw 63 in order to permit the reciprocatory movement of the drill holder and set screw relatively to the guide boss 58. Different sizes of drills 35 can be mounted in the drill socket 62 by the use of different sizes of split bushings 66. As is well known to those skilled in the art, it is customary to provide a wide range of these longitudinally split drill bushings, all having the same outside diameter but different inside diameters for different size drills. The set screw 63 compresses the split bushing against the drill shank. The holes 56 for receiving the clamping screws 57 are substantially larger than the screws to provide for alignment adjustment of the drill after the deep drilling attachment has been mounted in the turret head. Thus, after the attachment has been mounted in the turret head and the drill is approximately aligned with the bar stock S and with the centering hole 34' therein, any slight misalignment can be easily corrected by loosening the screws 57 and shifting the tool head 55 and drill holder 61 in the appropriate direction to correct the misalignment, following which the screws 57 are tightened for locking the parts in the aligned position. These adjustments of the drill holder for effecting axial alignment of the drill are readily accommodated by my improved spring and cam form of reciprocating mechanism for reciprocating the drill holder, as will be later described.

Figure 5:
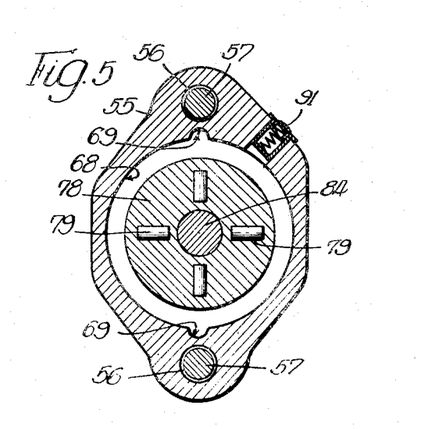
Figure 5 is a transverse sectional view taken approximately on the plane of the line 5—5 of Figure 3.

As clearly shown in Figure 5, the tool head or cover portion 55 has an enlarged cylindrical cavity or chamber 68 cored out in its back side. Formed in the top and bottom of this cylindrical cavity are two longitudinally extending key guideway grooves 69, preferably of semi-circular contour. The reciprocable drill holder 61 has a radially extending flange 71 at its inner end which is positioned in this cylindrical cavity or recess. Two keying lugs or guide lugs 72 project from the top and bottom of this flange 71 for sliding guided engagement within the guide ways 69. This arrangement of guide ways and guide lugs positively holds the reciprocable drill holder 61 against rotation so that the torque of the revolving bar stock S will not revolve the drill 35 and drill holder 61 relatively to the remainder of the attachment.

Figure 11:
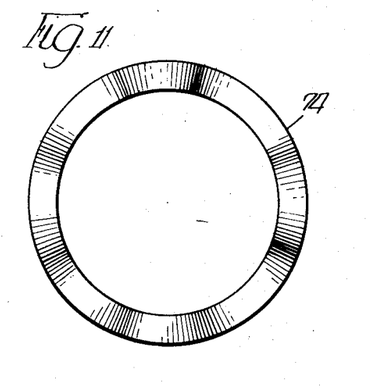
Figure 11 is an elevational view of the circular return spring.
Figure 12:
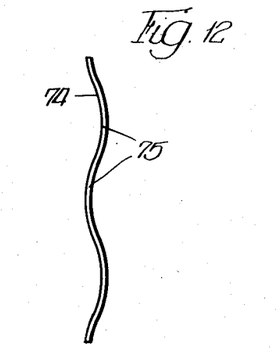
Figure 12 is an edge view thereof.

Confined between the back wall of the cylindrical recess 68 and the adjacent side of the flange 71 is a circular retracting spring 74. As shown in Figures 11 and 12, this spring is preferably of thin sheet material, such as beryllium copper, punched out in circular ring form. The successive undulations 75 are formed in this ring in the punching and forming thereof, and these undulations give the spring its resilient thrusting action of tending constantly to push the reciprocable drill holder 61 rearwardly or inwardly of the guide boss 58.

Figures 6, 7:
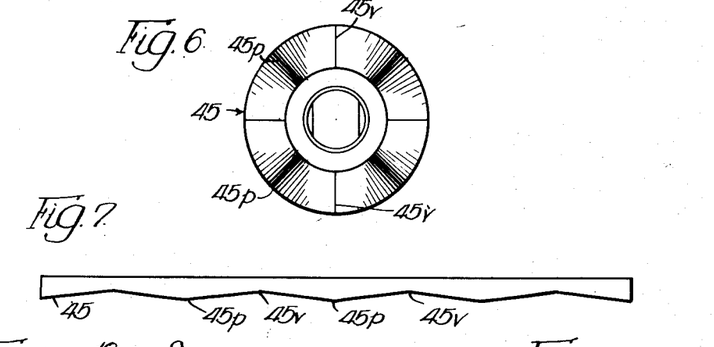
Figure 6 is a front elevational view of the revolving cam head, this view being on a larger scale.
Figure 7 is a developed view of the cam surfaces on the face of this cam head.
Figure 8:
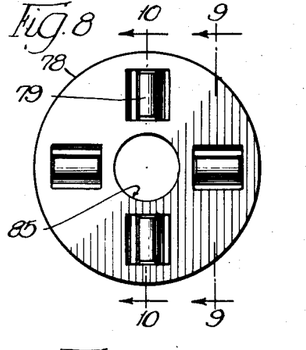
Figure 8 is an elevational view of the roller bearing assembly.
Figure 9:
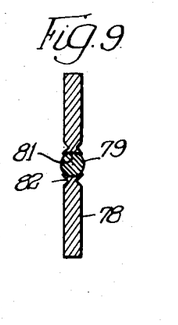
Figure 9 is a transverse sectional view taken approximately on the plane of the line 9—9 of this assembly.
Figure 10:
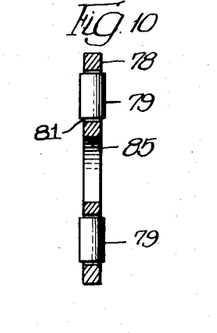
Figure 10 is an axial sectional view through the roller bearing assembly, taken on the plane of the line 10—10 of Figure 8.

Referring now to the cam and follower mechanism acting between the cam shaft 44 and the inner end of the drill holder 61 for imparting outward vibratory movement to the drill holder in opposition to the action of the spring 74, it will be seen from Figures 3 and 5 that a roller bearing assembly 77 is mounted to bear against the outer or front face of the cam head 45 and constitutes a cam follower. As shown in Figures 8, 9 and 10, this roller bearing assembly comprises a roller cage 78 in the form of a metallic disc in which are mounted radially disposed rollers 79 which have their peripheries projecting from the front and back sides of the disc 78. As shown in Figure 9, the disc is formed with radially extending cylindrical openings 81 for receiving the rollers 79, and after the assembly of the rollers within these openings the edges of the openings are staked at 82 to form lips of metal which overlie the rollers and rotatably hold them within the openings 81. As shown in Figure 3, the cam shaft 44 is formed with a reduced outer extension or neck 84 extending through a circular opening 85 in the disc 78 and acting as an arbor for holding the roller bearing assembly properly centered relatively to the cam head or flange 45. The inner peripheral surfaces of the rollers 79 have rolling engagement on relatively shallow cam peaks and valleys formed radially in the front surface of the head or flange 45, these cam peaks and valleys defining a face cam on the front surface of the head 45. A developed view of these cam peaks and valleys is illustrated in Figure 7, the degree of cam displacement being considerably exaggerated in this figure for clarity of illustration. I have found from actual practice that a very effective chip breaking action is obtained with a range of cam displacement in the order of .006 to .008 of an inch, but it will be understood that a greater or lesser cam displacement may be employed if desired. The drilling of different materials, the rotation of bar stock at different speeds, or other different operating conditions, may make it desirable to change the degree of oscillatory movement of the drill, and this can be readily accomplished by merely substituting a different cam shaft 44 and cam head 45 having different depths of cam formations in the front face thereof. The cam peaks 45p are diametrically opposite from each other, and, correspondingly, the cam valleys 45v are also diametrically opposite to each other, resulting in four pairs of peaks and valleys for the four rollers the peaks being 90° apart and the valleys being 90° apart and midway between the peaks. The outer peripheral surfaces of the rollers 79 projecting from the front face of the roller cage 78 have rolling engagement against a hardened thrust washer 88 which is centered on the shaft extension 84 and bears against the inner end of the drill holder 61. This thrust washer does not rotate with the roller bearing assembly, but affords a readily renewable stationary thrusting surface against which the rollers 79 have rolling engagement. In this regard, a renewable thrust washer 89 is also preferably interposed between the back side of the cam head 45 and the inner wall of the circular recess 53 in mounting body 51.

It will be seen that as the cam head 45 revolves within the circular recess 53, the roller bearing assembly will be held pressed against the cam formations in the cam head by the action of the retracting spring 74. Thus, the roller bearing assembly 77 will revolve at a speed which is a mean between the revolving speed of the cam head 45 and the zero speed of the thrust washer 88, i. e. the roller bearing assembly will revolve substantially at half the speed of the cam head 45. Thus, the four rollers will rise and fall twice with respect to the four peaks and four valleys of the cam formation in each revolution of the cam. Hence, the drill 35 will be oscillated axially through two complete strokes for each revolution of the cam shaft 44. Referring again to the ability to adjust the axial alignment of the drill by loosening the screws 57 and shifting the tool head 55 across the face of the body flange 51, it will be seen that this adjusting motion is readily accommodated by the relative transverse sliding motion which can occur between the drill holder 61 and the thrust washer 88, and also between this thrust washer 88 and the roller bearing assembly 78.

The moving parts of the attachment are lubricated through an oiler fitting 91 which is carried by the cover portion 55 and opens into the cylindrical chamber area 58. This oil immerses the cam head 45 and roller bearing assembly 77, and can pass around the flange 71 for lubricating the ground guide surface 59 of the guide boss 58. Also, as shown in Figure 3, a small lubricating passageway extends in back of the inner thrust washer 89 for conveying lubricant to the rotating joint between the shank bushing 42 and the cam shaft 44.

The driving bevel gear 49 is an accessory or attachment which is commonly provided in these indexing turrets 24 when it is desired to provide the turret with a tap or die revolving attachment, or with a combination drilling and tapping attachment. This same driving bevel gear 49 can be employed for driving the cam of my deep drilling attachment through the bevel pinion 48.

As is well known to those skilled in the art, the driving bevel gear 49 is mounted on a drive shaft 93 which is usually arranged to be driven either from an overhead main counter-shaft driving the automatic screw machine, or from an auxiliary counter-shaft disposed in rear of the machine. A typical driving arrangement is schematically illustrated in Figure 2, from which it will be seen that the rear end of the shaft 93 carries a belt pulley 94 over which is trained a belt 95 extending to a drive pulley 96 on an auxiliary countershaft 97. Such auxiliary counter-shaft 97 is usually located in rear of the automatic screw machine and slightly above the level of the bed. This counter-shaft is usually provided with a drive pulley at one end which is belt driven from the motor shaft, as is well known to those skilled in the art. The flexibility and length of span of the belt 95 readily accommodates the tool positioning traverse and the tool feeding motion given the turret slide. Such tool traverse motion and tool feeding motion are effected by automatic mechanisms well known in the art of automatic screw machines. If it is desired to adjust or change the oscillatory frequency of the vibratory drill 35, this can be accomplished by changing the speed of the auxiliary counter-shaft, or by changing the diameter ratios of the driving pulley 96 and driven pulley 94. An average or typical rotative speed of the attachment shaft 93 for driving tap or die revolving attachments in the conventional automatic screw machine is in the neighborhood of 1500 R. P. M. However, as stated in the forepart or general statement of this specification, I prefer to drive the attachment shaft 93 at a higher speed than is customary in the case of tap or die revolving attachments. For example, I prefer to drive the attachment shaft at approximately 1700 R. P. M. under average or typical drilling conditions, such as when using a drill no larger than a ½ inch drill. In the bevel gear set 48, 49 illustrated in Figure 1, I have shown the driving bevel gear 49 as having a pitch diameter approximately twice the pitch diameter of the driven bevel gear 48, and in the bevel gear set of Figure 3 I have shown the driving bevel gear 49 as having a pitch diameter almost three times the pitch diameter of the driven bevel gear 48. Hence, with the attachment shaft 93 rotating at 1700 R. P. M., and with these typical bevel gear proportions, the cam shaft 44 of my deep drilling attachment will be rotated at speeds ranging from approximately 3400 R. P. M. to possibly 5100 R. P. M. or even higher. Inasmuch as the rate of axial vibration of the drill holder is twice the rotative speed of the cam shaft 44, it follows that these cam shaft speeds will transmit vibratory impulses to the drill holder ranging from approximately 6800 to possibly 10,000 vibrations per minute. Thus, even if the work piece S being drilled is rotating at a speed as high as 6000 R. P. M., the vibratory rate of the deep drilling attachment affords at least one or more vibratory movements of the drill 35 in each revolution of the work piece. In instances where the automatic screw machine is not equipped with an auxiliary counter-shaft 97, it may be cheaper and more expeditious to provide the turret 24 with an individual electric motor drive unit 103, as I shall now describe in connection with Figures 13 and 14.

Figure 13:
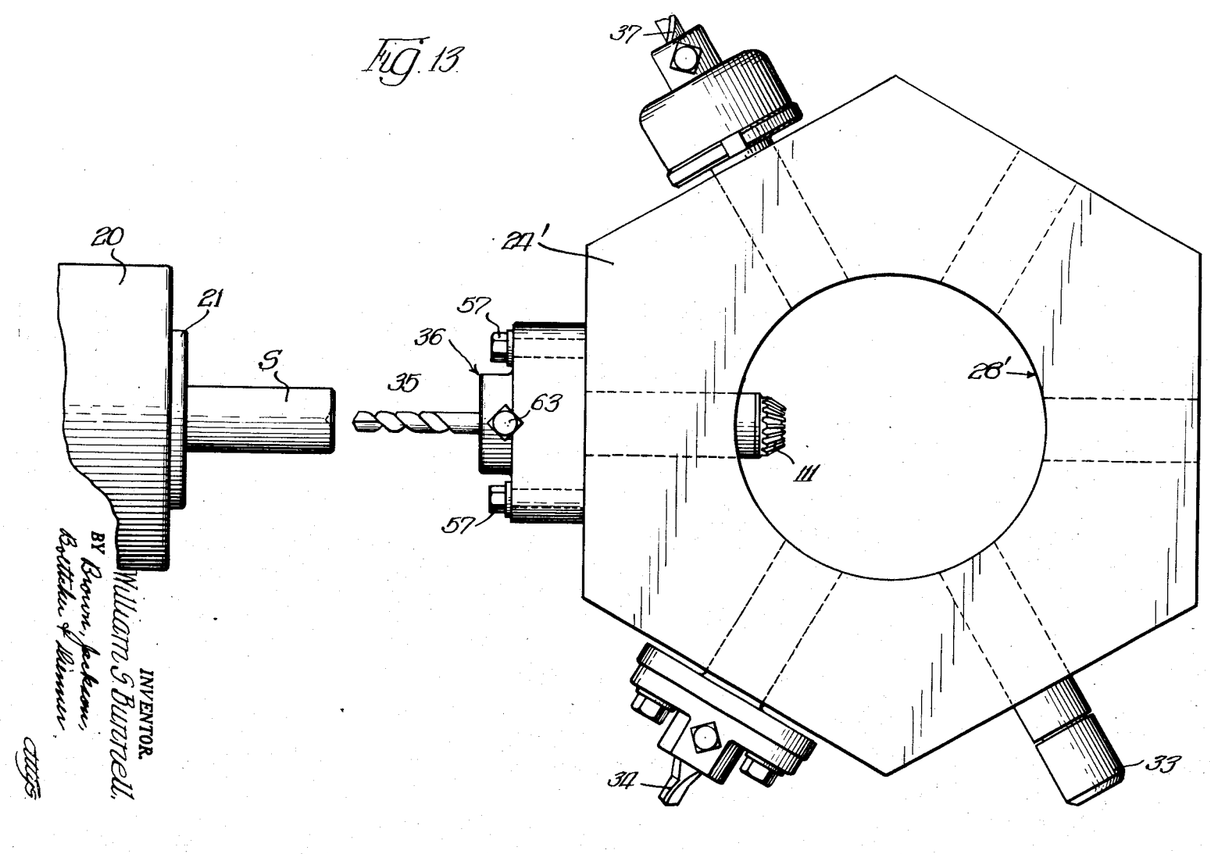
Figure 13 is a fragmentary plan view somewhat similar to Figure 1, illustrating my improved deep drilling attachment mounted on the turret of a hand screw machine or a turret lathe.
Figure 14:
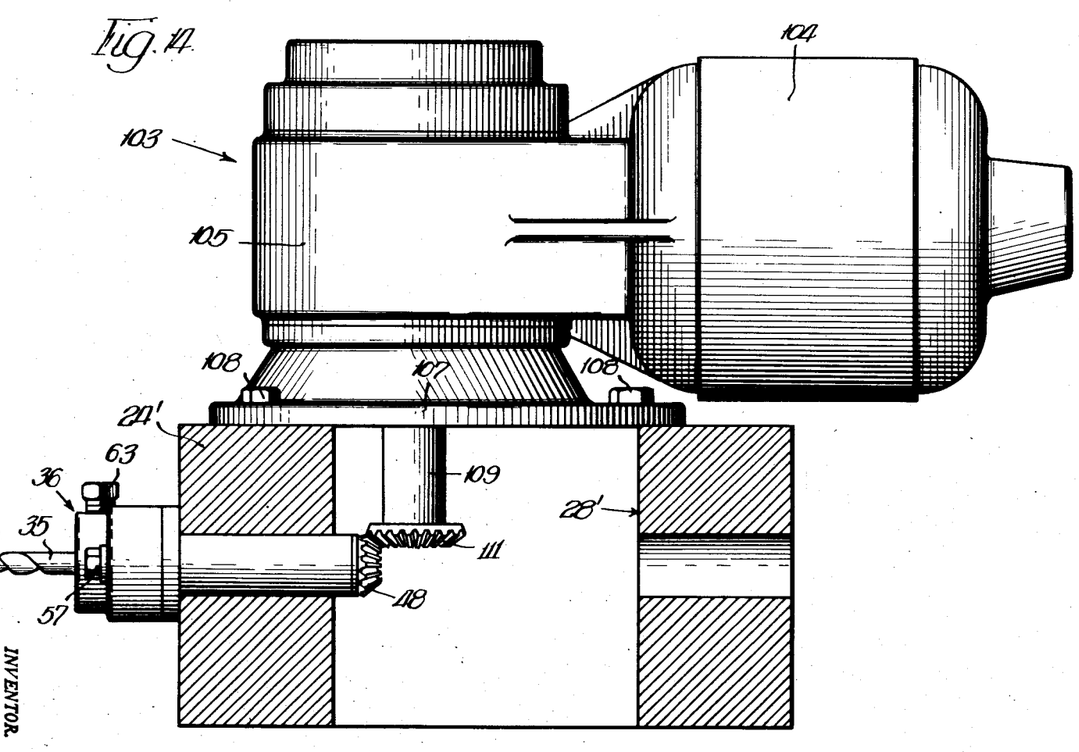
Figure 14 is a vertical sectional view through such turret, illustrating one manner of driving the bevel gear set therein from an individual electric motor drive unit mounted on top of the turret.

In Figures 13 and 14 I have illustrated my deep drilling attachment mounted in the turret of a conventional hand screw machine, or a conventional turret lathe. In hand screw machines and in turret lathes, the turret, designated as 24' is usually disposed in a horizontal plane, and the indexing of the turret to the different tool positions is usually performed manually, although it might be performed automatically. The bar stock S is revolvably carried by a spindle 21, or by a collet, lathe chuck or the like in substantially the same manner as above described. These horizontally disposed turrets 24' of hand screw machines and turret lathes may be provided with a centrally located driving bevel gear for driving the rotary parts of conventional drilling and tapping attachments, etc. However, in many instances the turret is not arranged for such a centrally disposed driving bevel gear, and for those cases I provide an individual electric motor drive unit 103 for driving the cam shaft 44, which motor drive unit is mounted directly upon the top of the turret, as shown in Figure 14. In this construction, the electric motor 104 is preferably formed as a unit with a gear transmission housing 105. The base portion of the transmission housing is provided with an attaching flange 107 adapted to be secured by cap screws 108 or the like to the top of the turret 24'. Any suitable transmission mechanism may be provided within the housing 105 for establishing a right angle drive from the motor shaft to a downwardly extending drive shaft 109, such transmission being typically represented by a pair of bevel gears. The vertical drive shaft 109 extends down into the central opening 28' of the turret and carries a driving bevel gear 111 at its lower end for meshing with the bevel pinion 48 which drives the cam shaft 44 of the deep drilling attachment. Substantially the same deep drilling attachment 36 can be mounted on these horizontally disposed turrets as on the vertical turrets of the automatic screw machine, and they have substantially the same mode of operation described above. Also, as just described above, these electric motor drive units 103 can be mounted at the end of the turret 24 of the automatic screw machine for driving the cam shaft 44, instead of using the counter-shaft belt drive of Figure 2. If desired, a speed control might be provided for the electric motor 104, or the transmission mechanism within the housing 105 might be of the variable speed type for adjusting the oscillation frequency of the non-rotating drill 35. In these electric motor drive units the motor shaft and bevel gear shaft 93 might be made coextensive or as a single shaft, without any intervening transmission mechanism.

In each of the above described uses of my improved deep drilling attachment, the feeding rate may be at least as high as the recommended standards for that machine when performing conventional step drilling operations using a particular size of drill, and drilling a particular type of material. In fact, I recommend that when using my improved deep drilling attachment, the feeding rate be increased approximately 10% over prior recommended standards when drilling average materials, and that this feeding rate be increased up to approximately 25% over prior standards when drilling stainless steel of type 303. It is advisable to try for as high a spindle speed as possible, or as is consistent with the correct surface feet of the drill being used.

While I have illustrated and described what I regard to be the preferred embodiment of my invention, nevertheless, it will be understood that such is merely exemplary and that numerous modifications and re-arrangements may be made therein without departing from the essence of the invention.

I claim:

1. In a deep drilling attachment having means for securing it to automatic screw machines, hand screw machines, turret lathes and like machines which revolve the work being drilled, the combination of a drill holder adapted to hold a drill, means mounting such drill holder whereby it can reciprocate endwise but cannot rotate, spring means tending to thrust said drill holder in one direction, and cooperating cam and roller means rotating with respect to one another about an axis substantially coaxial with the axis of said drill holder operative to thrust said drill holder in the opposite direction, said spring means and said cam and roller means cooperating for imparting axial vibratory motion to said drill holder, and an actuating shaft extending substantially lengthwise of the direction of reciprocation of the drill holder, said shaft being connected at one end to actuate the cooperating cam and roller means and the other end extending to the machine to which the attachment is secured, said shaft having means at said other end for actuating it from the machine to which the attachment is secured for actuating the cooperating cam and roller means for vibrating the drill while the work is being revolved in contact with the drill, so as to break up the chips and thereby avoid or minimize pull-out operations.

2. In a deep drilling attachment for mounting on the turret of automatic screw machines, hand screw machines, turret lathes or the like, the combination of a mounting body comprising a shank for mounting in one of the tool holding bores of the turret, a drill holder mounted for reciprocal non-rotative movement in said mounting body, spring means for thrusting said drill holder axially in one direction, a cam shaft coaxial with and rotatably mounted in said shank, means at the end of the shaft for establishing shaft driving connections from the machine on which the attachment is mounted, a face cam head on the end of said cam shaft having radially formed cam surfaces therein, and roller means substantially coaxial with the shaft acting between said cam head and drill holder for imparting thrusting movement to the drill holder in the other direction, and means for maintaining the roller means centered about the longitudinal axis of the cam shaft.

3. In a deep drilling attachment of the class described, the combination of a mounting body having a tubular stem at one end, means forming a guide bore at the other end of the attachment, and an enlarged chamber therebetween, a rotating cam shaft journaled in said tubular stem, a drive gear for the cam shaft mounted on the outer end of said cam shaft, a drill holder guided for reciprocatory movement in said guide bore, a radial flange projecting from the inner end of said drill holder and disposed in said chamber, keying lugs projecting from said radial flange and having sliding engagement in co-operating key guideways formed in the walls of said chamber to prevent rotation of said drill holder while permitting endwise reciprocation thereof, a spring confined between said radial flange and the adjacent end wall of said chamber tending to thrust said drill holder in an inward retracting direction, a cam head on the inner end of said cam shaft, a series of radially extending cam peaks and valleys formed in the end face of said cam head, a roller cage rotatably mounted in said chamber, a thrust washer bearing against said inner end of said drill holder, and radially extending rollers mounted in said roller cage having their inner peripheral surfaces riding on said cam peaks and valleys and their outer peripheral surfaces riding on said thrust washer, whereby said roller cage revolves at a speed substantially one-half the speed of said cam head and said rollers coact with said cam peaks to thrust said drill holder in an outward projecting direction, whereby rotation of the shaft is translated into reciprocatory chip breaking movement of the drill holder.

4. In a deep drilling attachment for turret mounting in an automatic screw machine or like machine tool which revolves the work being drilled and which also imparts a cutting feed traverse to the turret in a direction toward the work in the drilling operation, the combination of a mounting body for mounting in said turret, a tool head carried thereby, a drill holder mounted for reciprocation in said tool head, spring means tending to thrust said tool holder in one direction, a rotary shaft in said mounting body and extending axially of said mounting body to the turret, cam means actuated by said shaft and operative to thrust said tool holder in the opposite direction in opposition to the action of said spring, adjustable fastening means for securing said tool head to said mounting body permitting shifting of the tool head relative to said mounting body for effecting alignment adjustment of the drill with respect to the axis of rotation of the work after the mounting body has been mounted in said turret, and means coaxial with the shaft and carried thereby and located within said turret for driving said shaft to transmit a high speed short stroke chip breaking reciprocation to the drill carried by said drill holder continuously throughout the entire drilling operation and concurrently with the cutting feed traverse imparted to said cutting head.

5. A device for mounting on a machine for use in drilling machinable material by relative rotation and chip bearing motion between a drill member and a member to be drilled, said device including a head having a central bore, a holder for holding one of said members, said holder being axially slidable in said bore, a body, said body having a centrally located shank for mounting it on a machine, a shaft journalled in the shank and extending longitudinally thereof, the shaft and the body being rotatable with respect to one another, means for locking the head and the body together, means including said shaft for imparting a chip-breaking movement to the member held in said holder by reciprocating the holder axially; said last named means comprising a cam structure and a follower structure, one of the two structures being held by the shaft against rotation with respect to the shaft about the longitudinal axis of the shaft, means for maintaining the other of the two structures coaxial with the shaft, and means for rotating one of said two structures with respect to the other structure about the longitudinal axis of the shaft in response to relative rotation of the shaft and the body with respect to one another.

6. A device for mounting on a machine for use in drilling machinable material by relative rotation and chip bearing motion between a drill member and a member to be drilled, said device including a head having a central bore, a holder for holding one of said members, said holder being axially slidable in said bore, a body, said body having a centrally located shank for mounting it on a machine, a shaft journalled in the shank, the shaft and the body being rotatable with respect to one another, means aligning the head and the body so that the axis of the shaft is parallel to the axis of the bore of the holder and permitting relative adjustment of the head with respect to the body to shift said axes with respect to one another while maintaining them in parallelism, means for locking the head and the body together in their adjusted positions, means including said shaft for imparting a chip-breaking movement to the member held in said holder by reciprocating the holder axially; said last named means comprising a cam structure and a follower structure, one of the two structures being held by the shaft against rotation with respect to the shaft about the longitudinal axis of the shaft, means for maintaining the other of the two structures coaxial with the shaft regardless of the adjustment of the head and body with respect to one another, and means for rotating one of said two structures with respect to the other structure about the longitudinal axis of the shaft in response to relative rotation of the shaft and the body with respect to one another.

7. A device for mounting on a machine for use in drilling machinable material by relative rotation and chip bearing motion between a drill member and a member to be drilled, said device including a head having a central bore, a holder for holding one of said members, said holder being axially slidable in said bore, a body, said body having a centrally located shank for mounting it on a machine, a shaft journalled in the shank, means outside of the shank for rotating the shaft with respect to the shank, means for locking the head and the body together, and means including said shaft for imparting a chip-breaking movement to the member held in said holder by reciprocating the holder axially; said last named means comprising a cam and a follower, the cam extending radially from the shaft and being fixed thereto, the shaft including a neck portion projecting axially from the cam and in a direction towards the holder and coaxial with the longitudinal axis of the shaft, the follower being journalled on said neck for maintaining the two structures coaxial with the shaft, and means for producing relative movement of the cam and follower with respect to one another about the longitudinal axis of the shaft in response to relative rotation of the shaft and the body with respect to one another.

8. A device for mounting on a machine for use in drilling machinable material by relative rotation and chip bearing motion between a drill member and a member to be drilled, said device including a head having a central bore, a holder for holding one of said members, said holder being axially slidable in said bore, a body, said body having a centrally located shank for mounting it on a machine, a shaft journalled in the shank, means outside of the shank for rotating the shaft with respect to the shank, means aligning the head and the body so that the axis of the shaft is parallel to the axis of the bore of the holder and permitting relative adjustment of the head with respect to the body to shift said axes with respect to one another while maintaining them in parallelism, means for locking the head and the body together in their adjusted positions, and means including said shaft for imparting a chip-breaking movement to the member held in said holder by reciprocating the holder axially; said last named means comprising a cam and a follower, the cam extending radially from the shaft and being fixed thereto, the shaft including a neck portion projecting axially from the cam and in a direction toward the holder and coaxial with the longitudinal axis of the shaft, the follower being journalled on said neck for maintaining the two structures coaxial with the shaft regardless of the adjustment of the head and body with respect to one another, and means for producing relative movement of the cam and follower with respect to one another about the longitudinal axis of the shaft in response to relative rotation of the shaft and the body with respect to one another, and a plate-like thrust member between the cam follower and the holder and against which the thrust of the follower is imposed.

9. A device for mounting on a machine for use in drilling machinable material by relative rotation and chip bearing motion between a drill member and a member to be drilled, said device including a head having a central bore, a holder for holding one of said members, said holder being axially slidable in said bore, a body, said body having a centrally located mounting shank, a shaft journalled in the shank, the shaft and the body being rotatable with respect to one another, means aligning the head and the body so that the axis of the shaft is parallel to the axis of the bore of the holder and permitting relative adjustment of the head with respect to the body to shift said axes with respect to one another while maintaining them in parallelism, means for locking the head and the body together in their adjusted positions, means for reciprocating the holder axially, said reciprocating means comprising a cam structure and a follower structure, means for maintaining the two structures coaxial with the shaft regardless of the adjustment of the head and body with respect to one another, and means for rotating one of said two structures with respect to the other structure about the longitudinal axis of the shaft in response to relative rotation of the shaft and the tool body with respect to one another, whereby rotation of the shaft is translated into reciprocation of the holder.

10. A chip breaking tool-holding device for use in drilling machinable material, which comprises a body having a sleeve portion fittable into a holder of a turret of an automatic screw machine or the like and also being provided with a counterbore at one end thereof, a cap having a bearing portion and a counterbore at one end, means securing the cap to said end of the body in a position in which the counterbores are facing one another, a tool holder having a shank portion fitting closely and slidably axially in the bearing portion of the cap and also having an external flange slidable in the counterbore in the cap, a spring in the counterbore in the cap between said flange and the base of the counterbore and urging the tool holder toward the body, a rotatable shaft mounted in the sleeve portion of the body and having a cam provided with lobes located in the counterbore in the body, said shaft having an arbor portion concentric therewith projecting from the cam toward the tool holder, a thrust bearing fitting closely and rotatably on the arbor portion, and transmitting thrust between the cam and the tool holder, whereby rotation of the shaft is translated into reciprocating chip breaking movement of the tool holder.

WILLIAM S. BUNNELL.

References Cited in the file of this patent

UNITED STATES PATENTS

| Number | Name | Date |
|---|---|---|
| 1,523,629 | Bullock | Jan. 20, 1925 |
| 2,276,611 | Connor | Mar. 17, 1942 |
| 2,453,137 | Karweit | Nov. 9, 1948 |
| 2,460,156 | Vanderhide | Jan. 25, 1949 |
| 2,581,258 | Karweit | Jan. 1, 1952 |